UNITED STATES PATENT OFFICE.

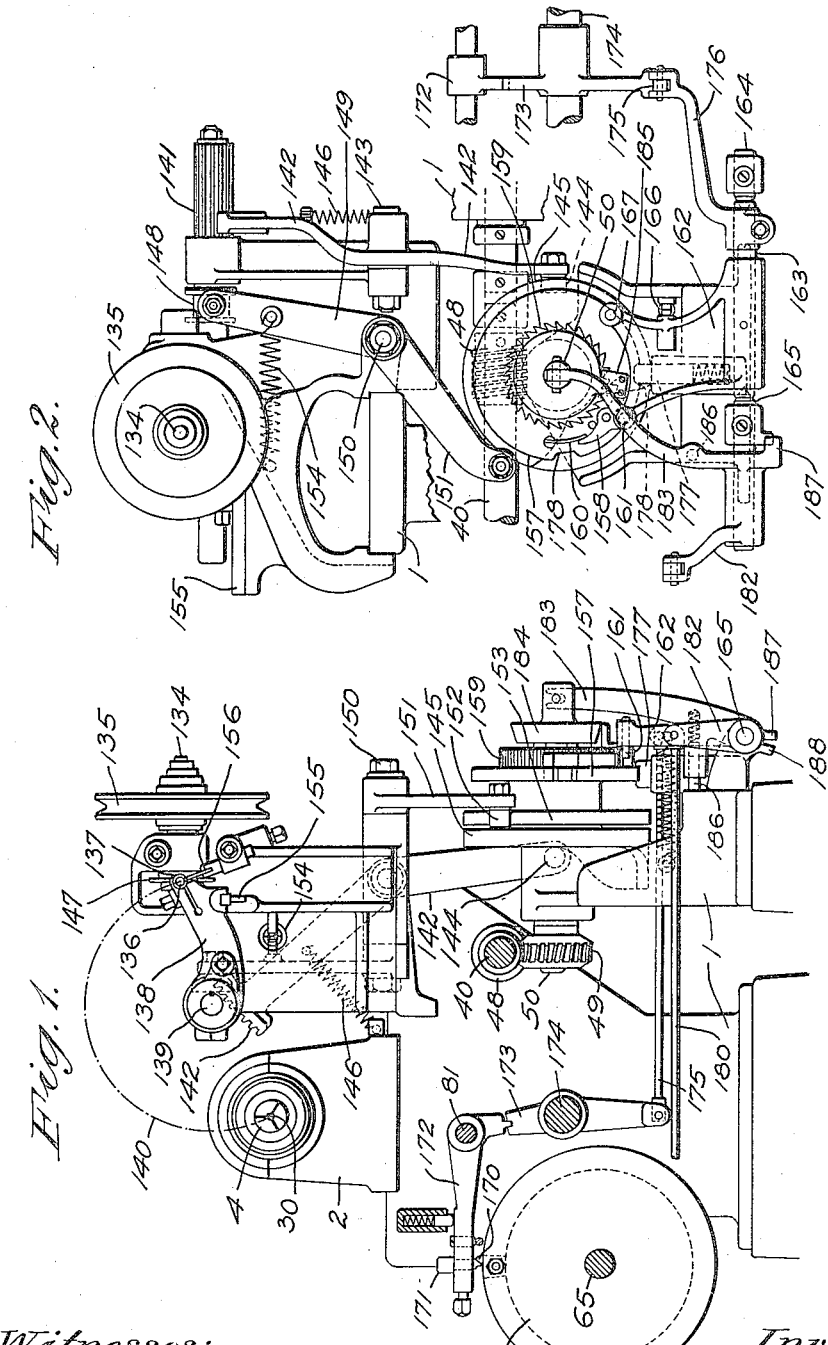

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

METAL-SCREW MACHINE.

1,140,324.  Specification of Letters Patent.  Patented May 18, 1915.

Original application filed April 7, 1910, Serial No. 553,965. Divided and this application filed April 25, 1914. Serial No. 834,322.

*To all whom it may concern:*

Be it known that I, BENGT M. W. HANSON, a citizen of the United States, residing at Hartford, in the county of Hartford and State of Connecticut, have invented new and useful Improvements in Metal-Screw Machines, of which the following is a specification.

This invention is herein shown and described as an adjunct or supplement to a machine of the type generally known as an automatic screw machine, for making metal screws, studs, pins and similar articles.

The mechanism in which the present invention is embodied is employed for performing upon the screw or other article supplemental operations such as slotting or drilling. By this mechanism the screws, pins, etc. when separated from the rod of stock are carried to a position at one side of the zone occupied by the ordinary tools of the screw machine, and there operated upon simultaneously with the making of the next piece.

This application is a division of my earlier application Serial No. 553,965, filed April 7, 1910.

Figure 1 of the drawings is an end elevation and Fig. 2 is a side elevation projected from Fig. 1.

This mechanism is mounted on a bed 1, which may be the main bed of the machine of which it is an adjunct. The head 2 carrying the work spindle 4 is or may be that of any well-known type of screw machine, or other machine capable of feeding the work to the mechanism of the present invention. A drill, saw, or other tool suited for the desired operation, in this case a slotting saw, is mounted in a suitable spindle, as 134, driven by a pulley 135 from any convenient source of motive power. The screw or other article to be operated upon, designated by 136, is received and held in a sleeve, chuck, or collet 137, adapted to properly receive and grip the article. This chuck or collet is carried in the end of an arm 138, which is mounted for swinging movement on or with the shaft 139, to carry the screw or other work after it is severed from the rod of stock 30, through the arc of movement indicated by the dot-and-dash line 140, to the resting position shown in Fig. 1. For this oscillatory movement of the arm 138, its shaft 139 is provided with gear teeth 141, meshing with a sector gear 142 mounted on the stud 143. A pin or anti-friction roller 144 in the lower end of the sector gear engages with a cam 145 which is fitted to turn loosely around the shaft 50. The contour of the cam is adapted to produce the desired oscillatory movement of the arm 138 represented by the dot-and-dash arc 140. After the work 136 is carried to the position shown in Fig. 1, the cutter or drill may be carried against it, or, as is herein shown, the arm 138 and its shaft 139 may be moved lengthwise to carry the work against the cutter. The grooved collar 148, fixed on the shaft 139, is engaged by a suitable shoe carried in the end of the arm 149, which is fixed on one end of the shaft 150, journaled in the bed 1, the other end of the shaft having fixed upon it the cam arm 151, the lower end of which is provided with a suitable pin or anti-friction roller 152 bearing against the cam 153, the contour of which is suited to the desired movement. It may be a closed cam, or an open sided cam like that shown herein, in which case a spring 154, or equivalent device is employed to make the roller 152 follow the contour of the cam, as the latter revolves. If the cam 145 is an open cam, a similar spring 146 should be employed to make the lower end of the sector 142 follow the contour of the cam, so as to compel the arm 138 to make its full stroke in accordance with the timing of the cam. A suitable supporting guide 155 may be employed, suited to the nature of the work, for supporting and guiding the arm 138 when in the position shown in Fig. 1, and during the time that the saw or drill, or other implement, is operating upon the work 137. A stripper 156 may also be employed to facilitate withdrawing the slotted screw from the chuck.

The cams 145 and 153 determine the amplitude and rate of movement of the sector 142 and the arm 149, but the time or period at which they are thrown into operation is determined by a control disk B carried by the control shaft 65, the rotation of which is determined by, or is coördinated with, the other operations of the machine with which the devices of the present invention are associated. In the present embodiment it is assumed that the control shaft 65 makes one complete rotation for each piece of work delivered by the main spindle 4 from the rod of stock 30. The control disk is provided with one or more adjustable tappets 170 acting through a control lever 172, and connections therefrom, to start the cams 145 and 153 in operation.

A flange 157 appurtenant to the cams 145 and 153 and mounted with them to turn loosely around the shaft 50 has pivotally mounted upon its rearward side a dog 158 which overhangs the tooth of a ratchet 159 secured to and constantly rotating with the shaft 50, which is herein shown to be provided with a worm wheel 49 driven by a worm 48 on the shaft 40, which is driven by, or coördinately with, the principal machine. To hold the cams 145 and 153 in a stationary position, the dog is held out of engagement with the teeth of the ratchet 159 by one or the other of the detents 161, 167. When the dog is released it is carried into contact with the teeth of that ratchet by the spring 160, the parts being arranged in this instance to impart either a complete rotation or intermittent partial rotation to the flange 157 and the cams 145 and 153. At the conclusion of the desired rotation, or partial rotation, the dog is withdrawn from contact with the ratchet 159 by means of one or both of the detents 161 and 167 carried by the arm 162, mounted on the shaft 163, which is herein shown to be pivotally supported on removable centers 164 and 165, these centers being easily retracted from the shaft to facilitate the assembling and disassembling of the parts. The arm turns on these centers sufficiently to carry the detents into and out of the path of revolution of the dog 158. A spring 166 is provided for holding the arm yieldingly during the position shown in Fig. 1, in engaging relation to the dog 158. Two of these detents 161 and 167 are employed when the nature of the work makes it desirable to arrest the operation of the mechanism for a period of time, or to divide it into two periods, or two operations, as for example, while the collet, after engaging with the screw, waits for the latter to be severed from the rod 30. In that case the movement of the dog 158 when released from the detent 161, and while traveling to the detent 167, would carry the collet 137 from the position shown in Fig. 1 through the arc 140 to its position in front of the rod 30. Stopped at this position by the detent 167 the slotting mechanism would stand still while the screw is being cut from the rod. Then the slotting mechanism, released from the detent 167 by the operation of a tappet on the disk B would complete its cycle of movement, stopping again at the detent 161. The arm 162 may be extended to cover the entire circle of revolution of the dog 158, and detents like 161 and 167 may be located at any desired portions of that circle. The movements of the arm 162 to release the dog 158 are initially controlled by an adjustable tappet or tappets 170 on the control disk 13, turning with the shaft 65, engaging with a tappet 171 on the control lever 172 turning on the shaft or stud 81. The control lever 172 engages by a gear tooth connection with the arm 173, which is pivoted on a shaft or stud 174 and has mounted on its lower end the connecting rod or link 175 connecting with the arm 176 on the shaft 163. By this arrangement the tappet 170 in passing the pin 171 raises the lever 172 and at once lets it drop again. The raising movement operates through the described connections to withdraw the detent 161 from the dog 158, thus allowing the latter to engage the ratchet 159 and thus rotating the cams 145 and 153, until stopped by the detent 167 or 161 after partial or complete rotations. In order to hold the cams against reverse rotary movement, due to the pressure of the spring 160 when the dog is disengaged by the detents 161 or 167, a spring-pressed plunger 177 mounted in the bed engages with recesses 178 in the periphery of the flange 157.

Means are also provided for manually stopping the rotation of the cams 145 and 153 at any portion of their rotative movement in addition to, and independently of, the detents 161 and 167. A rod 180, extending through to the front of the machine within reach of the operator, connects with an arm 182 mounted to turn freely on an extension of the supporting center 165. That arm is integral with or appurtenant to an arm 183 which extends upwardly into engagement with a friction disk 184 mounted for free sliding movement on the rearward end of the shaft 50. That disk has a beveled or tapered periphery, which when the rod 180 and its connections 182 and 183 are drawn forward, engages with an ear 185 of the dog 158, and swings the dog out of engagement with the teeth of the ratchet 159, at whatever portion of its rotation it may be. The continued movement of the disk 184 brings its forward face against the face of the ratchet 159, thus acting as a brake to stop further rotation, due to momentum. In this way the automatic control may be dominated by manual control, and the continued operation of the control lever 172 by the tappet 170 would have no effect in starting this department of the machine into operation. A spring pressed plunger 186 is preferably employed between the arm 183 and the bed of the machine, to move these manual control parts rearwardly and release the dog when the stop lever 181 is released, the backward or open resting position of these parts being determined by a stop 187 appurtenant to the arms 182 or 183, engaging with a similar stop 188 of the bed.

The operation of this mechanism is as follows:—Just before the piece of work 136 is severed from the rod 30 the carrier arm 138 is swung over so as to bring the collet 137 into alinement with the rod 30, and that collet is moved endwise upon the work by means of the cam 153. When the work is severed from the rod 30 the arm 38 is swung back to its position shown in Fig. 1, carrying the work 136 in front of the saw, drill, or other tool appropriate for the intended operation, against which the piece of work is carried, also by the operation of the cam 153, the arm being meanwhile guided and steadied by the support 155. At the end of its movement the work is retracted and released from the collet, leaving the mechanism free to repeat its operations upon the succeeding piece of work.

I claim as my invention:—

1. The combination, with a screw machine, of transfer mechanism for removing the completed articles, including in combination a swinging arm for receiving the said articles, mechanism for imparting swinging movement to the said arm, clutch mechanism for starting and stopping the transfer mechanism, and a control device driven with the machine for governing the clutch mechanism.

2. The combination, with a screw machine, of transfer mechanism, including a swinging arm for receiving the articles as they are completed, mechanism for swinging said arm through its transferring movement, clutch devices for stopping and starting the said mechanism, and unitary control devices for the entire machine, including a special control device for operating the said transferring mechanism in predetermined time relation to the movements of the screw machine.

3. The combination, with a screw machine, of transferring mechanism, including a swinging arm, transfer mechanism for swinging the said arm through its transferring movement, mechanism for moving the said arm in an axial direction relative to its swinging movement, clutch devices for stopping and starting the said mechanisms, and a control device driven with the screw machine for governing the time of operation of the said transfer mechanism.

4. The combination, with a screw machine, of transfer and slotting mechanism, including a swinging arm for receiving and transferring the articles laterally away from the end of the rod, mechanism for swinging the arm through its transferring movement, auxiliary mechanism for operating upon the said article, mechanism for moving the arm to carry the article into engagement with the said auxiliary mechanism, clutch devices for starting and stopping the said mechanism, and a control device for governing the time of operation of the clutch devices.

5. The combination, with a screw machine, of auxiliary transfer and cutting mechanism, including a swinging transfer arm for moving the said arm both in lateral and axial direction, means for imparting intermittent operations to the said mechanism, including a rotating driver, and a dog mounted to revolve with the said mechanism concentrically with the said driver, and stop pins disposed in the path of revolution of the dog, and movable out of and into that path, whereby partial revolutions may be imparted to said mechanism.

6. The combination, with a screw machine, of auxiliary transfer and cutting mechanism, including a swinging transfer arm for moving the said arm both in lateral and axial direction, means for imparting intermittent operations to the said mechanism, including a rotating driver, a dog mounted to revolve with the said mechanism concentrically with the said driver, a plurality of stop pins disposed in the path of revolution of the dog, and movable out of and into that path, whereby partial revolutions may be imparted to said mechanism, and an adjustable control device driven with the screw machine for governing the time of starting said partial revolutions.

7. The combination, with a screw machine, of mechanism, for transferring the articles from the screw machine to said auxiliary mechanism, clutch devices for intermittently operating said mechanism, a control device driven with the screw machine for governing the time of operation of the said clutch devices, and a super-control device for disconnecting the clutch at any desired rotative position of the mechanism.

8. The combination, with a screw machine, of auxiliary mechanism, clutch devices for intermittently operating the said auxiliary mechanism under the general control of the screw machine, and a super-control device for unclutching the mechanism to stop it at any desired period independently of its intermittent rotations.

9. The combination, with a screw machine, of auxiliary mechanism, clutch devices for imparting intermittent rotation to the auxiliary mechanism, an adjustable control device driven with the screw machine for governing the time of the intermittent operations, and a manually operated super-control device for stopping the said mechanism independently of its intermittent operations.

10. The combination, in a screw machine, of auxiliary mechanism, and of clutch devices for imparting intermittent rotation to the said mechanism, including a rotating driver, a dog mounted for revolution with the driven mechanism concentrically with the driver, and a cam plate movable into and out of the path of revolution of the dog, engaging therewith to move it out of engaging relation to the driver at all portions of its revolution.

11. The combination, in a screw machine, of auxiliary mechanism, and clutch devices therefor including a rotating driver, a dog revolving with the driven mechanism and in engagement with the driver, and a cam plate movable into and out of the path of revolution of the dog, and having an inclined surface for holding the dog out of engagement with the driver at all portions of the path of revolution of the dog.

12. The combination, with a screw machine, of auxiliary mechanism and clutch devices for driving said mechanism, including a rotating driver, a dog appurtenant to the driven mechanism revolving in concentric relation to the driver, and movable into and out of engagement with the driver, and a cam plate having an annular inclined surface movable into and out of the path of revolution of the dog to disengage the dog from the driver.

In testimony whereof I have signed my name to this specification in the presence of two subscribing witnesses this 21st day of April, 1914.

BENGT M. W. HANSON.

Witnesses:
KATHRYN T. M. O'CONNELL,
CAROLINE M. BRECKLE.

Copies of this patent may be obtained for five cents each, by addressing the "Commissioner of Patents, Washington, D. C."